(12) United States Patent
Hung et al.

(10) Patent No.: US 11,577,791 B2
(45) Date of Patent: Feb. 14, 2023

(54) VEHICLE TAILGATE WITH POCKET AND STEP

(71) Applicant: VENTRA GROUP, CO., Halifax (CA)

(72) Inventors: Joaquin Hung, Bradford (CA); Tony Fabiano, Bradford (CA); Steve jArjoura, Bradford (CA); Wayne Doswell, Bradford (CA)

(73) Assignee: VENTRA GROUP CO., Halifax (CA)

( * ) Notice: Subject to any disclaimer, the term of this patent is extended or adjusted under 35 U.S.C. 154(b) by 170 days.

(21) Appl. No.: 17/150,061

(22) Filed: Jan. 15, 2021

(65) Prior Publication Data

US 2021/0221448 A1 Jul. 22, 2021

Related U.S. Application Data

(60) Provisional application No. 62/962,426, filed on Jan. 17, 2020.

(51) Int. Cl.
*B62D 33/027* (2006.01)
*B60R 3/02* (2006.01)

(52) U.S. Cl.
CPC ............ *B62D 33/0273* (2013.01); *B60R 3/02* (2013.01)

(58) Field of Classification Search
CPC ........ B62D 33/0273; B62D 33/03; B60R 3/02
See application file for complete search history.

(56) References Cited

U.S. PATENT DOCUMENTS

| 688,448 A | 12/1901 | Thompson |
| 4,846,487 A | 7/1989 | Criley |
| 6,886,877 B1* | 5/2005 | Plavetich ........... B62D 33/0273 296/57.1 |
| 7,658,427 B2* | 2/2010 | Patton, Jr. .......... B62D 33/0273 296/57.1 |
| 8,201,869 B1* | 6/2012 | Butlin, Jr. ................. B60R 3/02 296/57.1 |
| 8,348,325 B2* | 1/2013 | Hausler ............. B62D 33/0273 296/62 |
| 8,740,279 B1 | 6/2014 | McGoff et al. |
| 8,919,853 B2 | 12/2014 | Krishnan et al. |

(Continued)

FOREIGN PATENT DOCUMENTS

| FR | 3078521 A1 | 9/2019 | |
| WO | WO 2021/163788 | * 8/2021 | ......... B62D 33/0273 |
| WO | WO 2021/163789 | * 8/2021 | ......... B62D 33/0273 |

*Primary Examiner* — Gregory A Blankenship
(74) *Attorney, Agent, or Firm* — Pillsbury Winthrop Shaw Pittman, LLP

(57) ABSTRACT

A tailgate system for a vehicle comprises a tailgate pivotally mounted to a vehicle body for movement about a generally horizontal pivot axis between an open position and a closed position. The tailgate has an access opening configured to provide access to a vehicle bed area when the tailgate is in the closed position. The tailgate also has a movable tailgate portion movably connected to the tailgate. The movable tailgate portion is configured to cover the access opening in the tailgate when in a closed position of the movable tailgate portion. The tailgate also has a pocket opening for receiving the movable tailgate portion therein. The movable tailgate portion is slideably mounted to the tailgate for movement to an open position in which the movable tailgate portion is received in the pocket opening in the tailgate to uncover the access opening in the tailgate.

12 Claims, 13 Drawing Sheets

Tailgate center pocket with deployed step feature

(56) References Cited

U.S. PATENT DOCUMENTS

| | | | |
|---|---|---|---|
| 9,315,221 B1 | 4/2016 | Anderson | |
| 9,463,746 B2 | 10/2016 | Butlin, Jr. et al. | |
| 9,522,621 B2 | 12/2016 | Krajenke et al. | |
| 9,950,750 B2 | 4/2018 | Baddage et al. | |
| 9,988,103 B1 * | 6/2018 | Mouch | B62D 33/0273 |
| 10,005,396 B2 | 6/2018 | Spahn et al. | |
| 10,106,087 B2 | 10/2018 | Stojkovic et al. | |
| 10,246,137 B2 | 4/2019 | Ngo | |
| 10,308,291 B2 | 6/2019 | Seki et al. | |
| 10,450,008 B2 | 10/2019 | Jacob et al. | |
| 10,464,618 B2 | 11/2019 | Lowe et al. | |
| 11,208,157 B2 * | 12/2021 | Borkar | B62D 33/037 |
| 2014/0136021 A1 | 5/2014 | Bambenek et al. | |
| 2014/0306425 A1 | 10/2014 | Akinson | |
| 2016/0046177 A1 | 2/2016 | Yamaguchi et al. | |
| 2021/0221448 A1 * | 7/2021 | Hung | B62D 33/0273 |
| 2021/0403097 A1 * | 12/2021 | Gase | E05F 15/605 |
| 2022/0097608 A1 * | 3/2022 | Patterson | B62D 33/0273 |

* cited by examiner ated step.

VEHICLE TAILGATE WITH POCKET AND STEP

CROSS-REFERENCE TO RELATED APPLICATIONS

This application claims priority to U.S. Provisional Patent Application No. 62/962,426, filed Jan. 17, 2020. The subject matter of this provisional is incorporated herein by reference in entirety.

BACKGROUND

Field

The present patent application relates to a vehicle tailgate system with a hidden pocket and an integrated step.

Description of Related Art

There are several accessibility features currently in the market on various vehicles/pickup trucks to improve access to the truck bed for loading and unloading the cargo. Examples include U.S. Pat. No. 688,448; U.S. Pat. Nos. 4,846,487; 8,201,869; 8,348,325; and 9,463,746; the entirety of which are incorporated herein by reference.

The present patent application provides an improved vehicle tailgate system.

BRIEF DESCRIPTION OF THE DRAWINGS

In one embodiment of the present patent application, a tailgate system for a vehicle is provided. The tailgate system comprises a tailgate pivotally mounted to a vehicle body for movement about a generally horizontal pivot axis between an open position in which the tailgate extends generally horizontally from a vehicle bed to allow access to a vehicle bed area and a closed position in which the tailgate extends generally vertically to close access to the vehicle bed area. The tailgate has an access opening configured to provide access to the vehicle bed area when the tailgate is in the closed position. The tailgate also has a movable tailgate portion movably connected to the tailgate. The movable tailgate portion is configured to cover the access opening in the tailgate when in a closed position of the movable tailgate portion. The tailgate also has a pocket opening for receiving the movable tailgate portion therein. The movable tailgate portion is slideably mounted to the tailgate for movement to an open position in which the movable tailgate portion is received in the pocket opening in the tailgate to uncover the access opening in the tailgate.

Other aspects, features, and advantages of the present patent application will become apparent from the following detailed description, the accompanying drawings, and the appended claims.

BRIEF DESCRIPTION OF THE DRAWINGS

Figure 1:
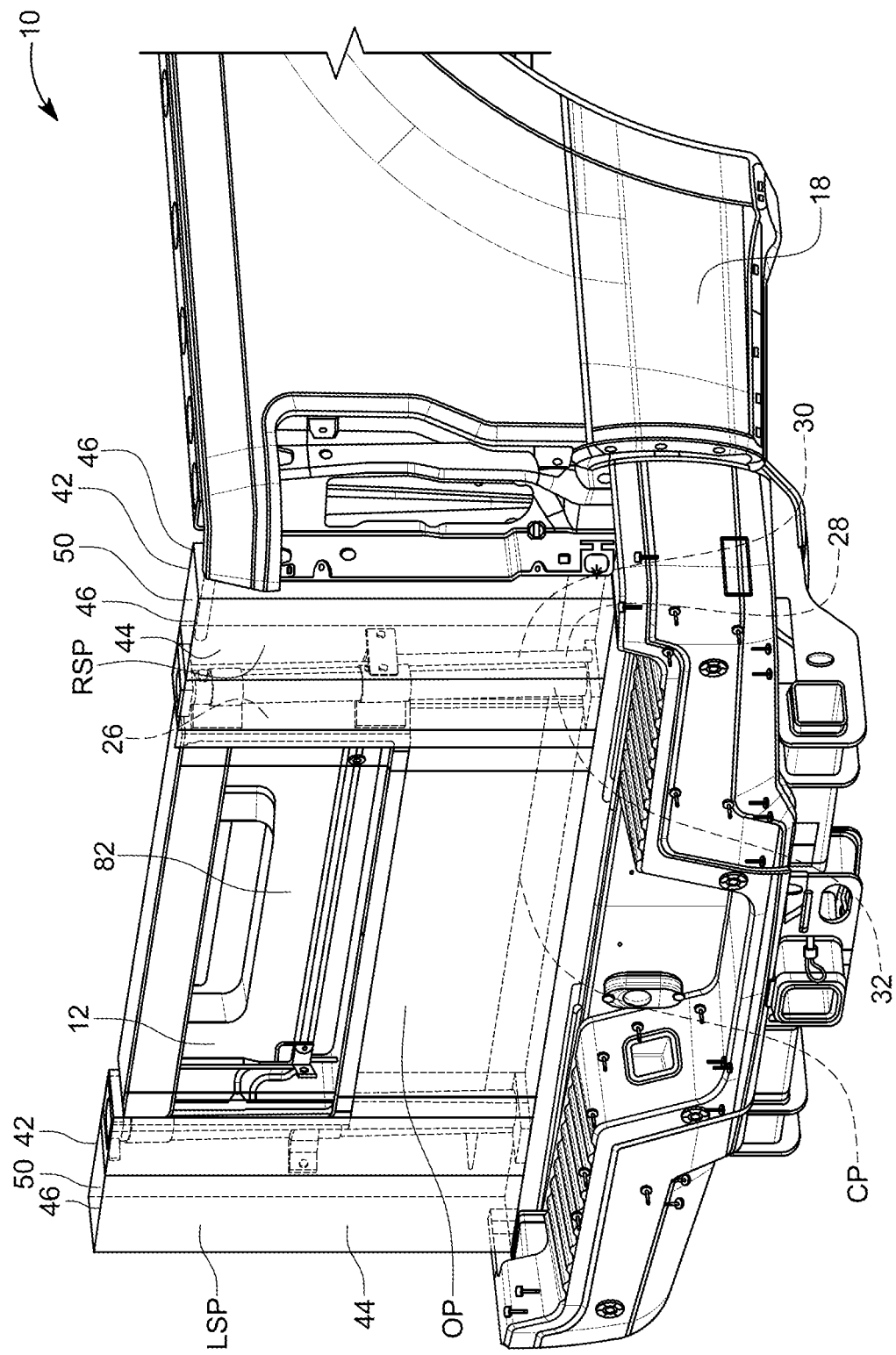
Figure 2:
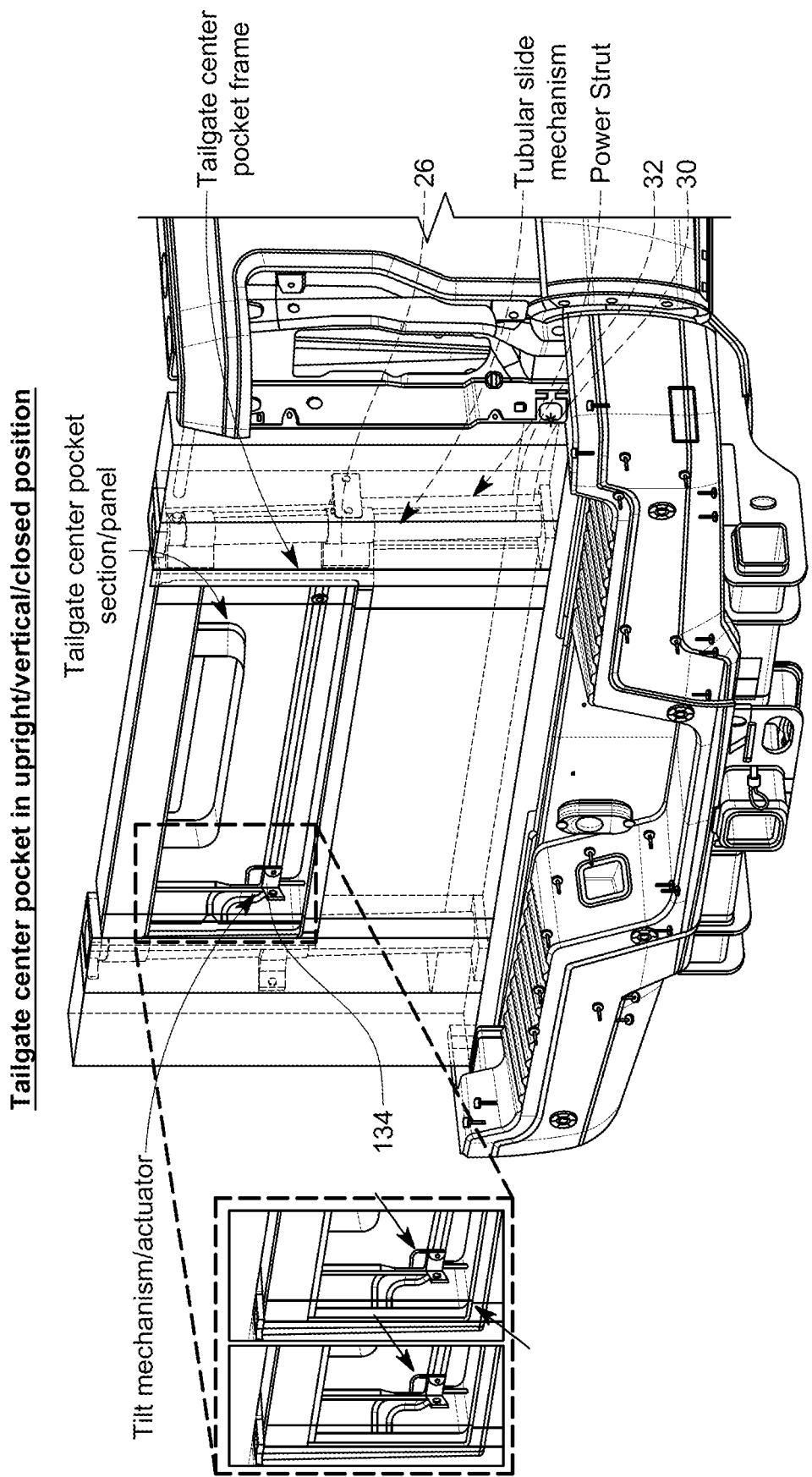
Figure 3:
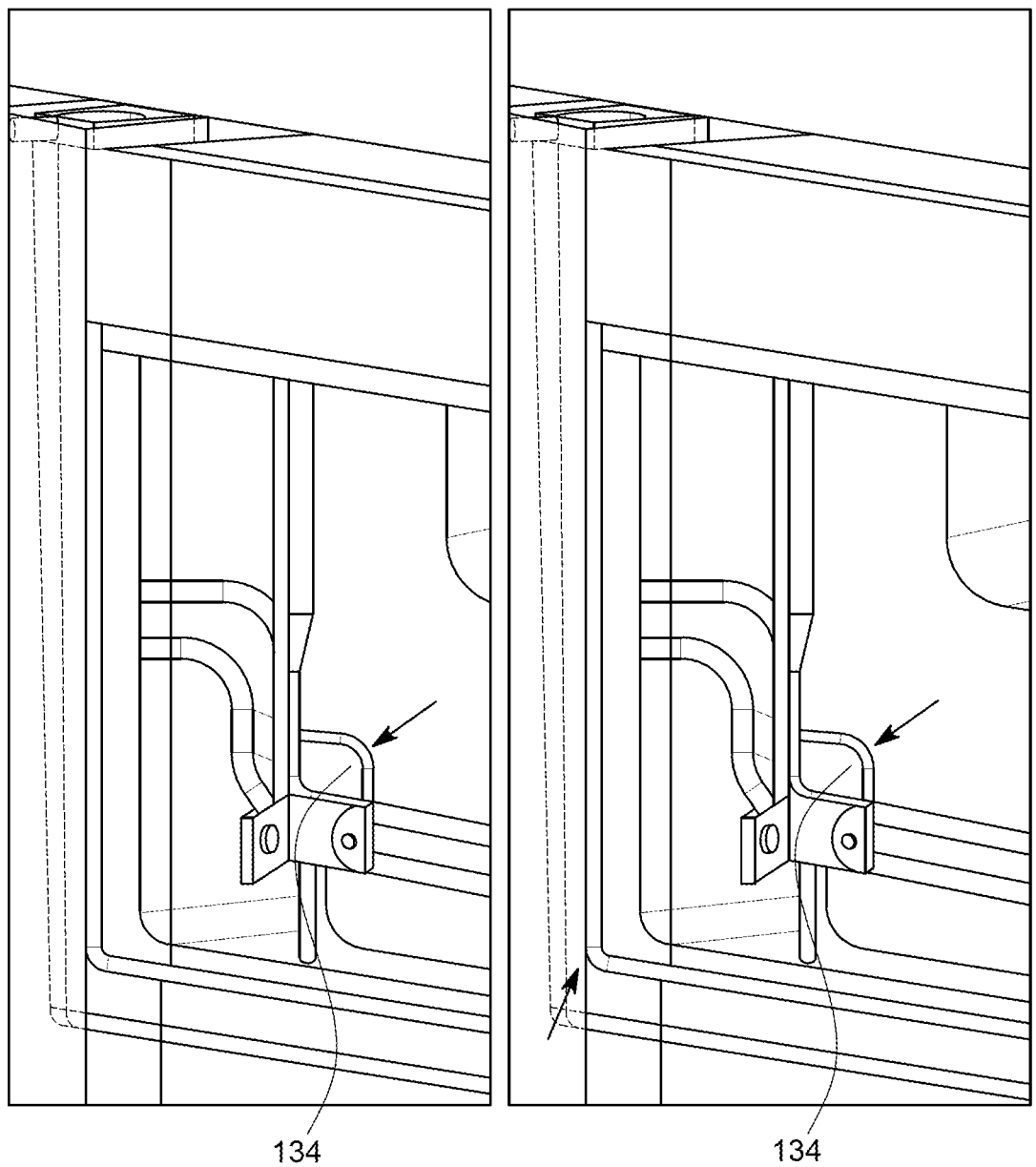
Figure 4:
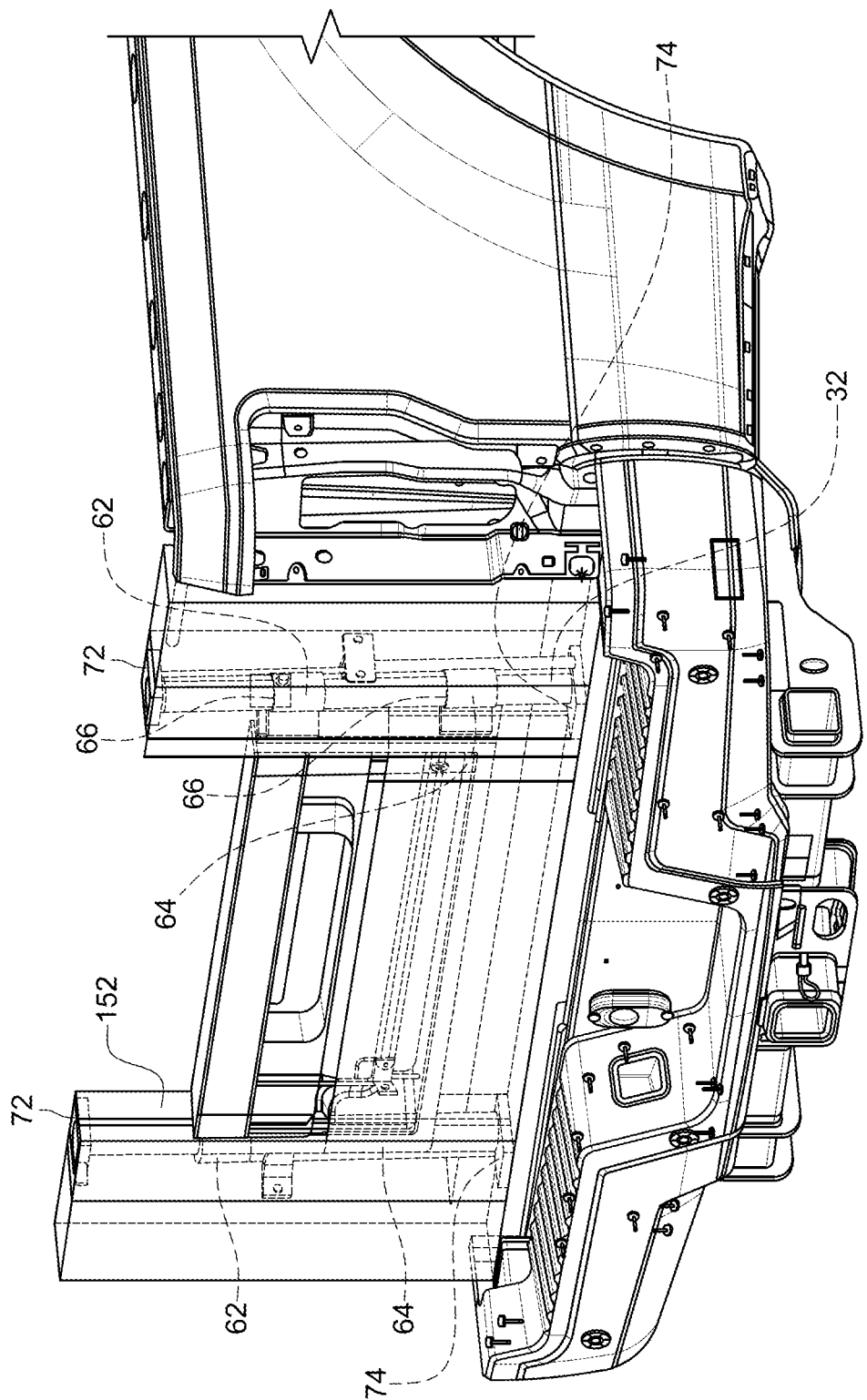
Figure 5:
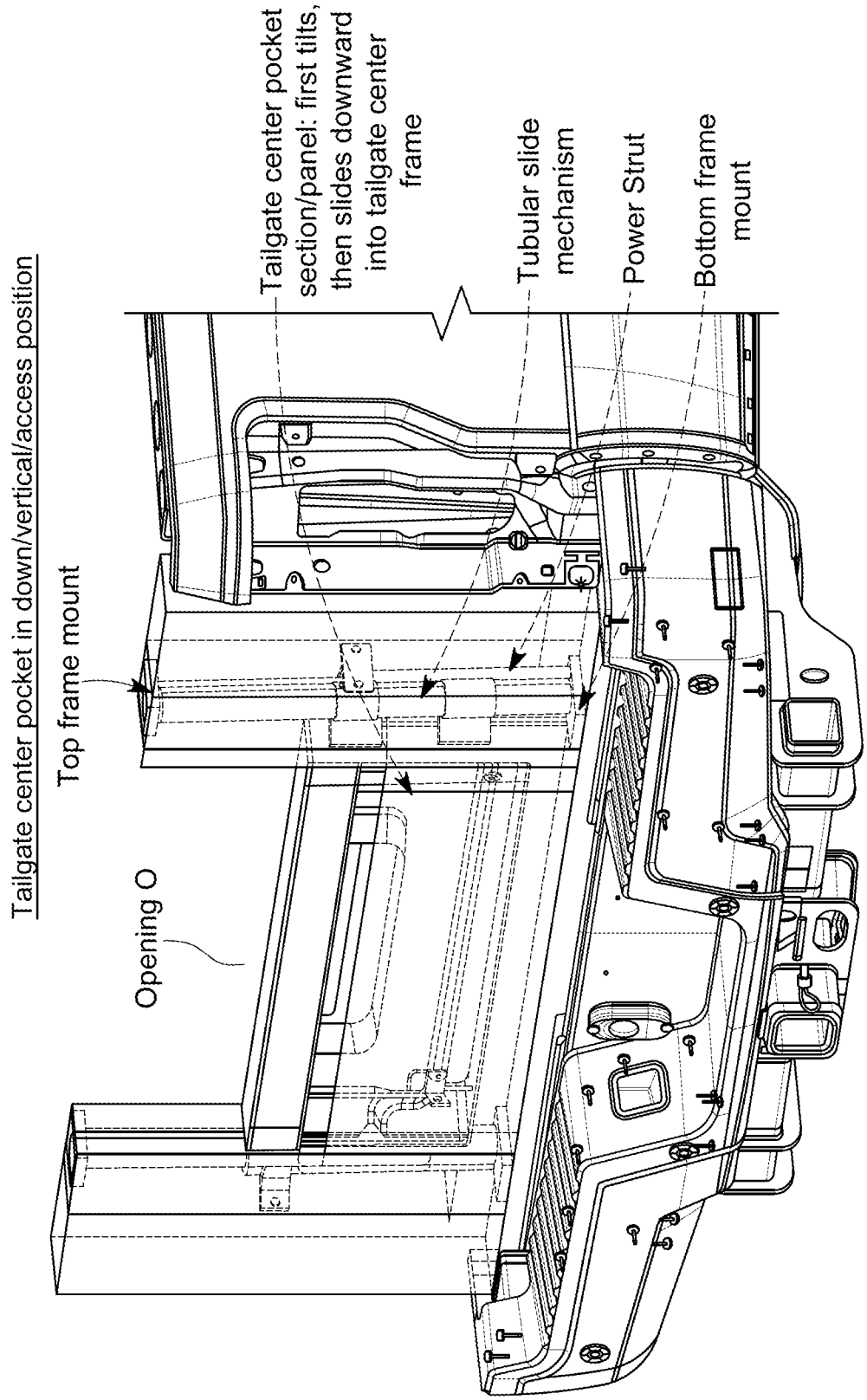
Figure 6:
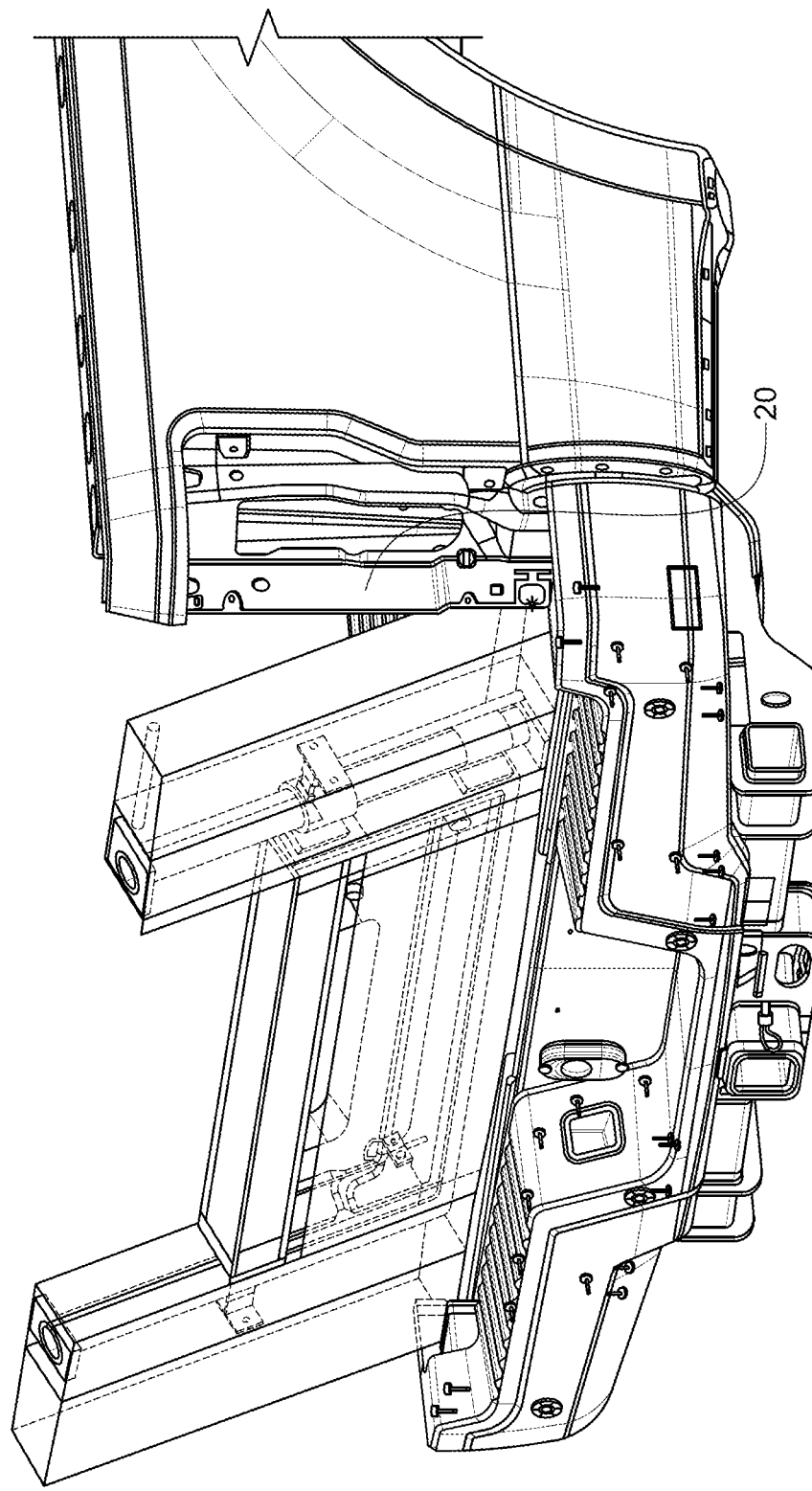
Figure 7:
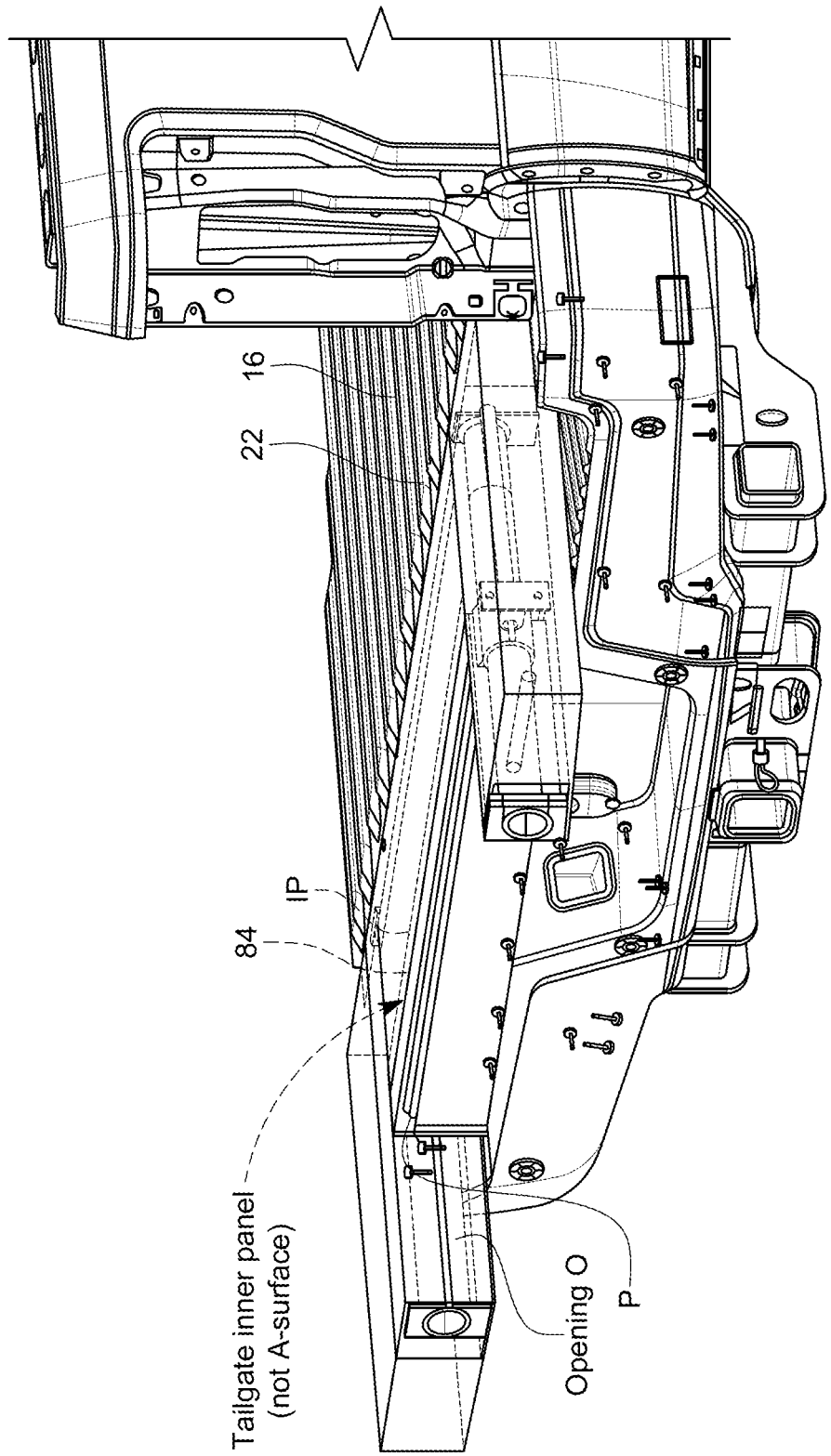
Figure 8:
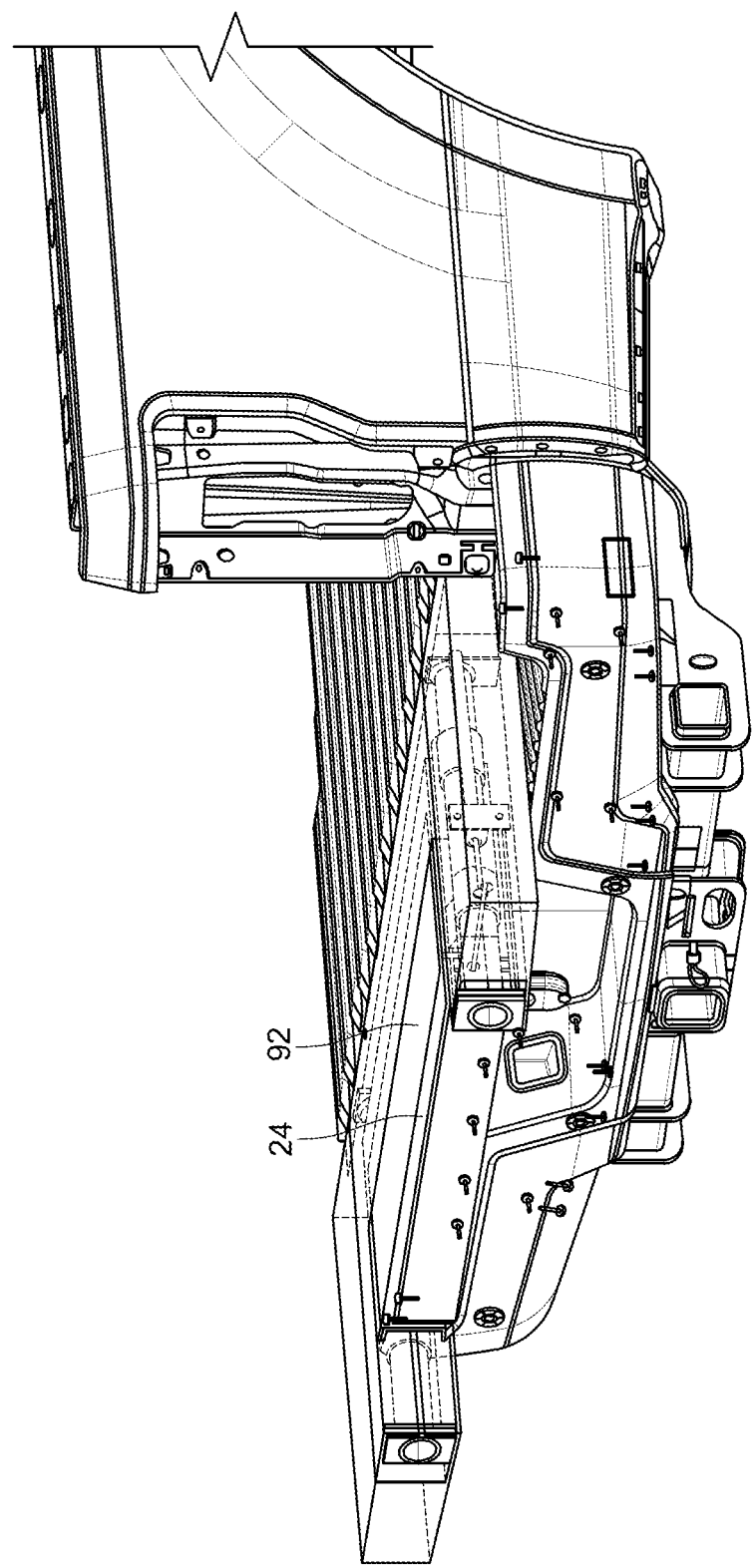
Figure 9:
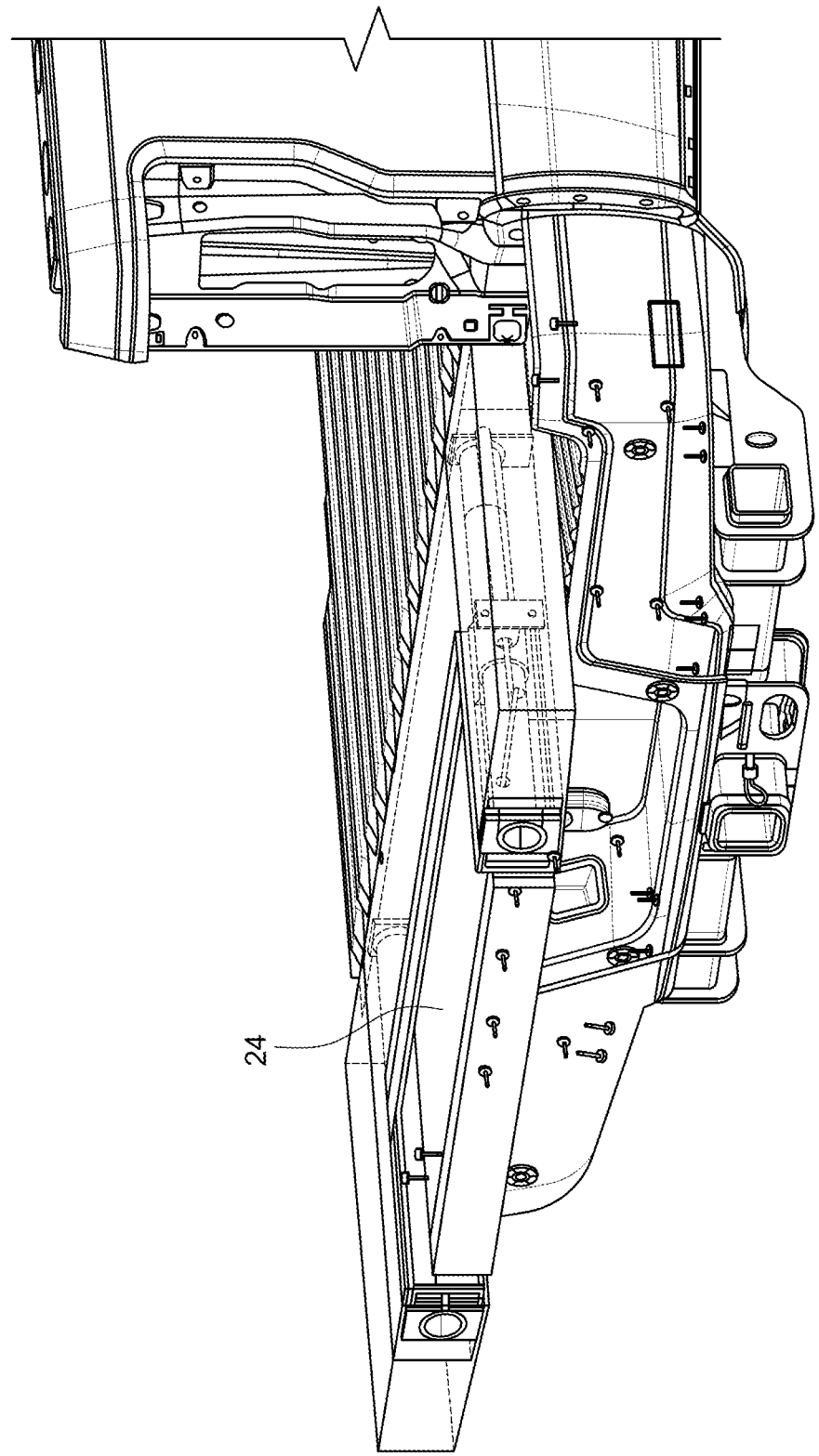
Figure 10:
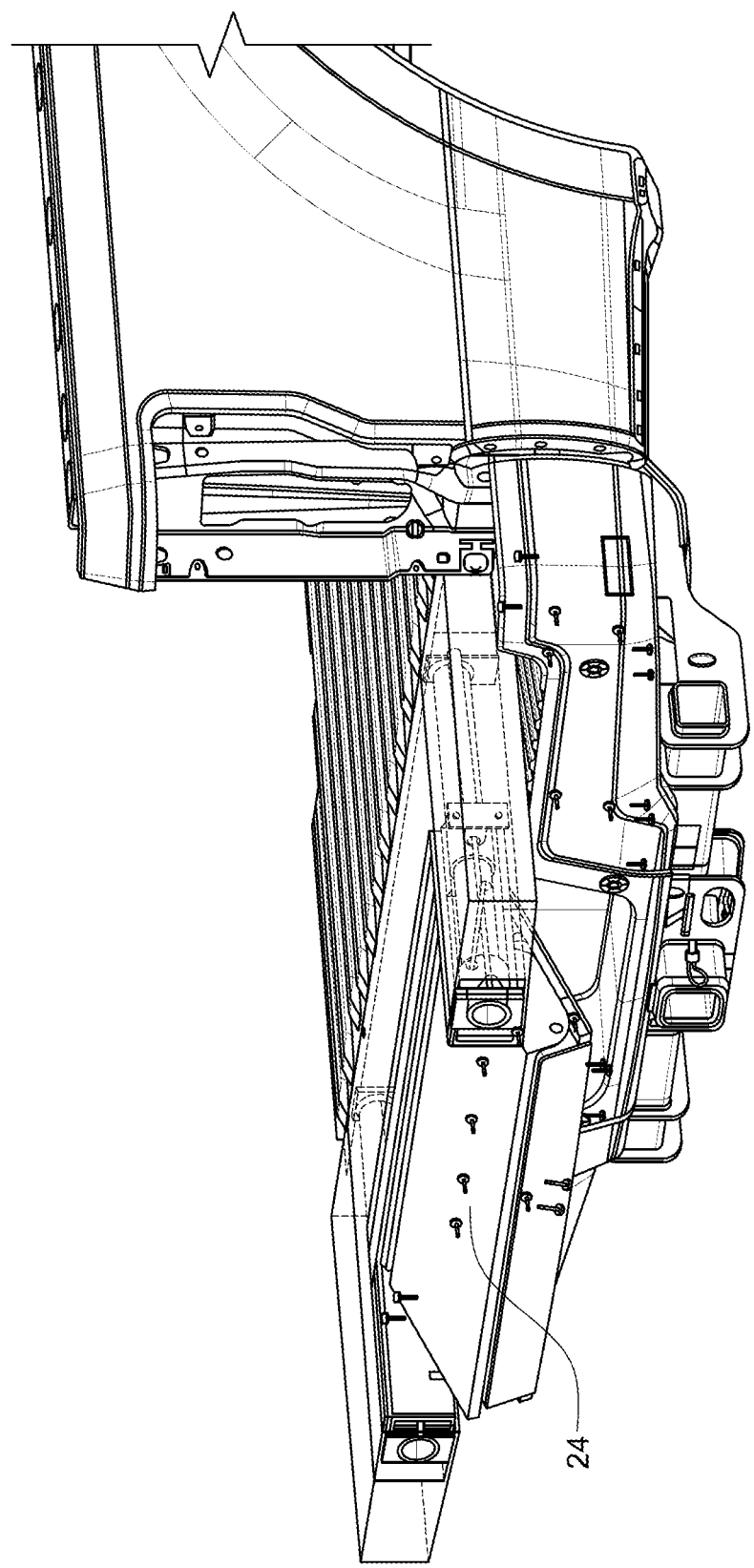
Figure 11:
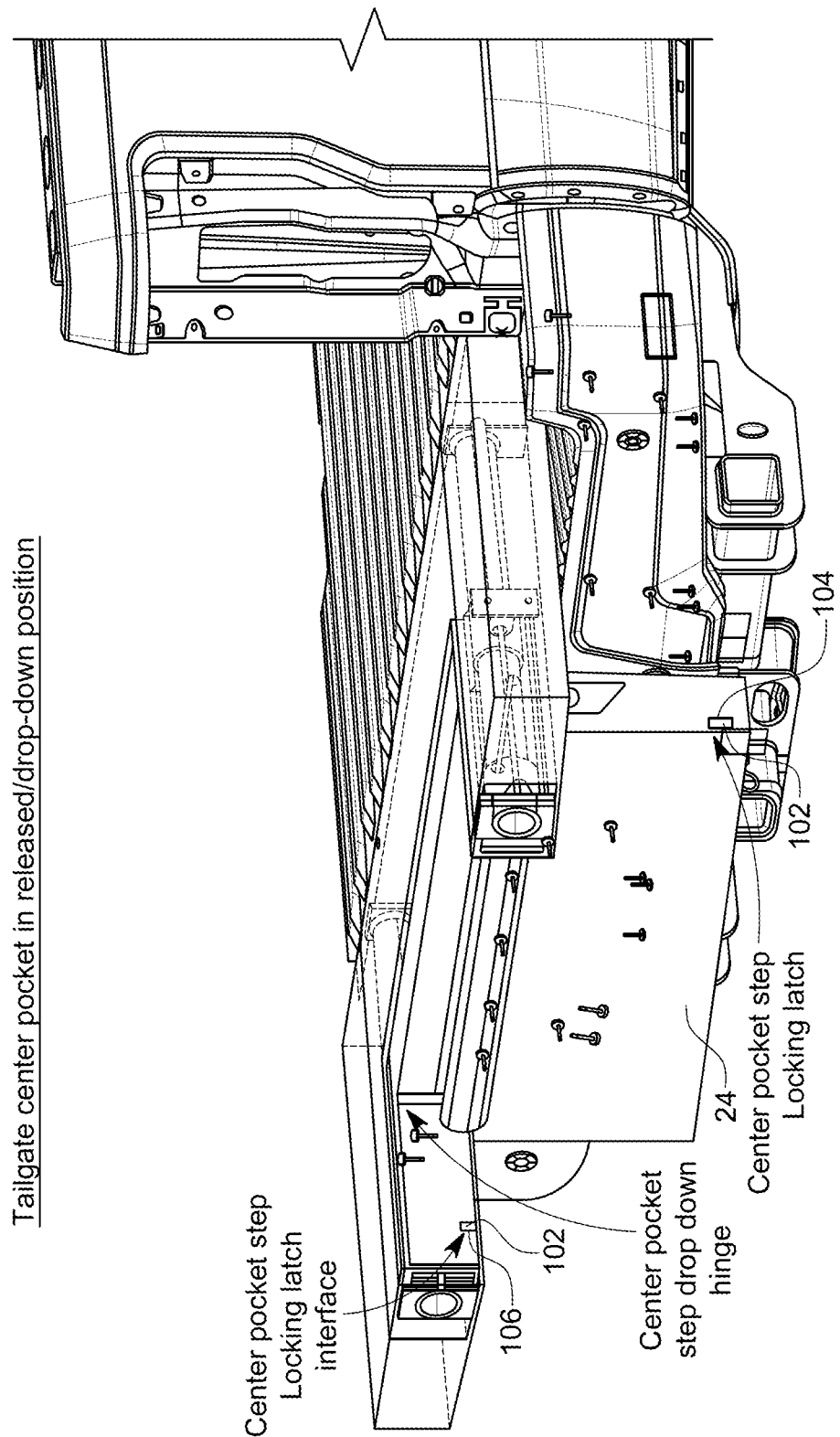
Figure 12:
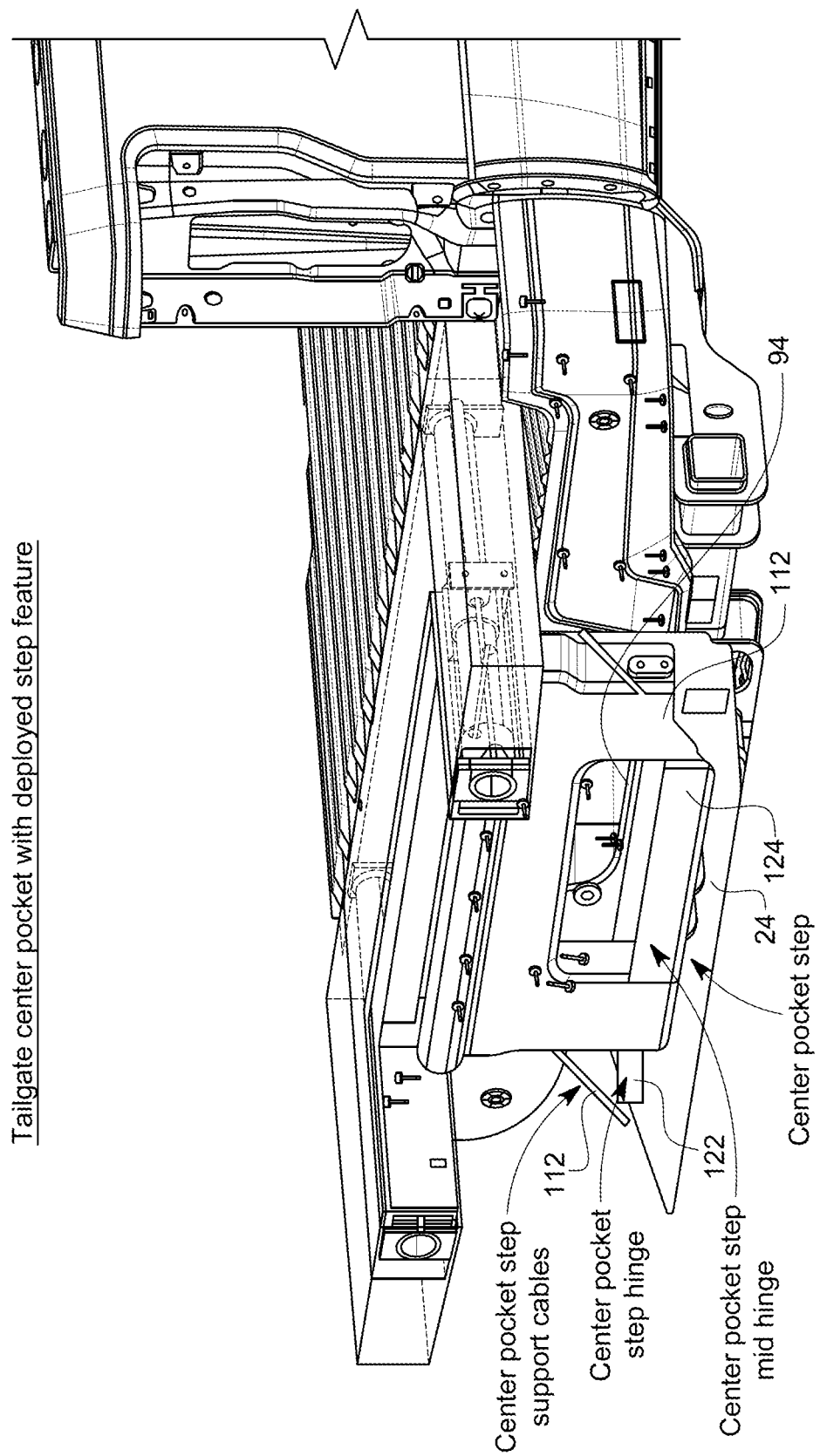
Figure 13:
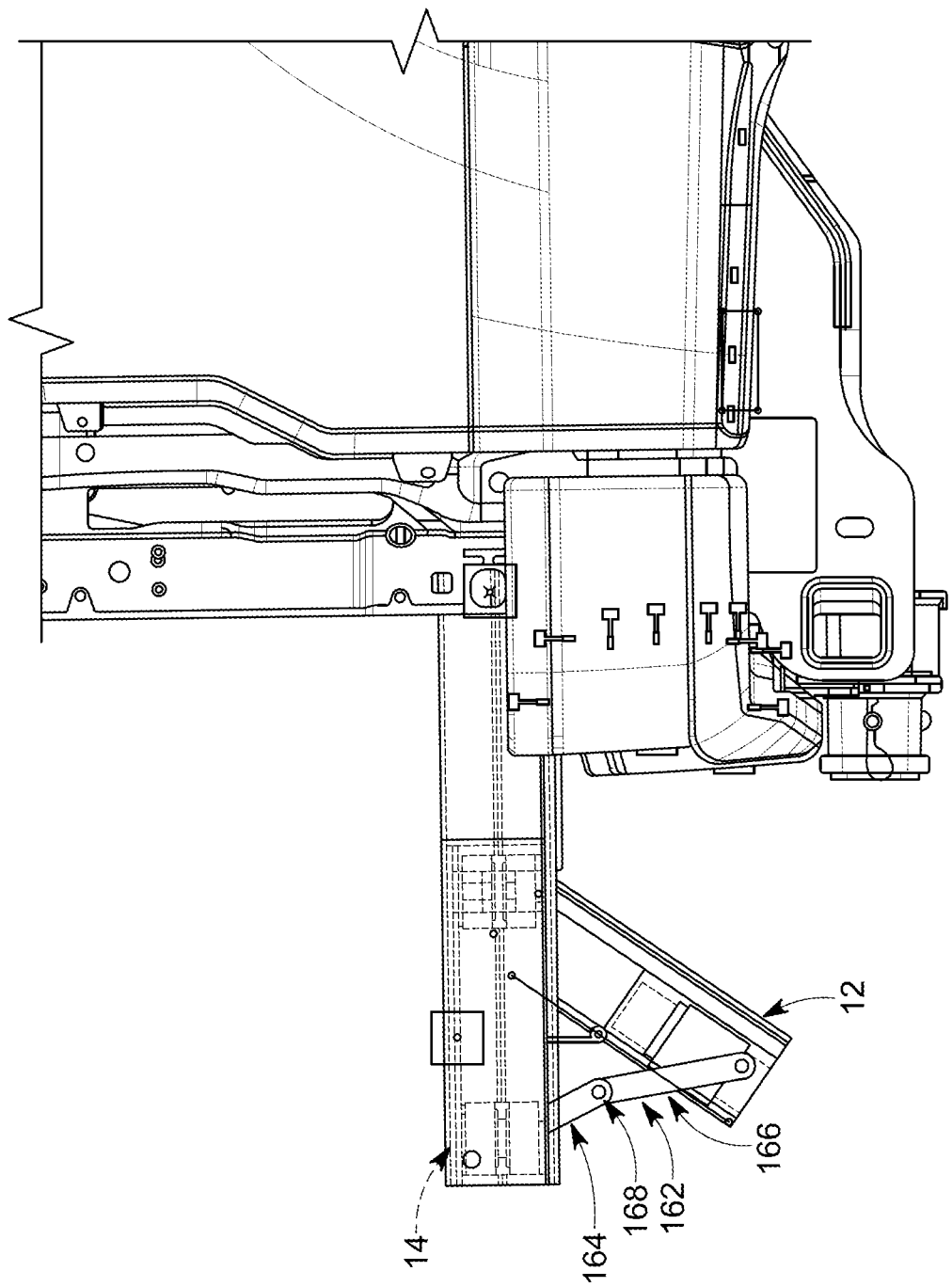

Various embodiments are disclosed, by way of example only, with reference to the accompanying schematic drawings in which corresponding reference symbols indicate corresponding parts, in which FIG. 1 shows a perspective view of a vehicle tailgate system in accordance with an embodiment of the present patent application, wherein a movable tailgate portion is in its upright/vertical/closed position and a tailgate is in its raised, closed position;

FIG. 2 shows another perspective view of the vehicle tailgate system in accordance with an embodiment of the present patent application, wherein the movable tailgate portion is in its upright/vertical/closed position and the tailgate is in its raised, closed position, and wherein an exemplary tilt mechanism/actuator of the vehicle tailgate system are also shown in detail;

FIG. 3 shows the exemplary tilt mechanism/actuator of the vehicle tailgate system in accordance with an embodiment of the present patent application;

FIG. 4 shows a perspective view of the vehicle tailgate system in accordance with an embodiment of the present patent application, wherein the tailgate is in its raised, closed position and the movable tailgate portion is in an intermediate position between its upright/vertical/closed position and its down/vertical/access position;

FIG. 5 shows a perspective view of the vehicle tailgate system in accordance with an embodiment of the present patent application, wherein the tailgate is in its raised, closed position and the movable tailgate portion is in its down/vertical/access position;

FIG. 6 shows a perspective view of the vehicle tailgate system in accordance with an embodiment of the present patent application, wherein the tailgate is in an intermediate position between its raised, closed position and its lowered, open position and the movable tailgate portion is in its down/vertical/access position;

FIG. 7 shows a perspective view of the vehicle tailgate system in accordance with an embodiment of the present patent application, wherein the tailgate is in its lowered, open position and the movable tailgate portion is in its hidden/horizontal/access position;

FIG. 8 shows a perspective view of the vehicle tailgate system in accordance with an embodiment of the present patent application, wherein the tailgate is in its lowered, open position and the movable tailgate portion is in an intermediate position between its hidden/horizontal/access position and its extended/horizontal position;

FIG. 9 shows a perspective view of the vehicle tailgate system in accordance with an embodiment of the present patent application, wherein the tailgate is in its lowered, open position and the movable tailgate portion is in its extended/horizontal position;

FIG. 10 shows a perspective view of the vehicle tailgate system in accordance with an embodiment of the present patent application, wherein the tailgate is in its lowered, open position and the movable tailgate portion is in an intermediate position between its extended/horizontal position and its released/drop-down position;

FIG. 11 shows a perspective view of the vehicle tailgate system in accordance with an embodiment of the present patent application, wherein the tailgate is in its lowered, open position and the movable tailgate portion is in its released/drop-down position;

FIG. 12 shows a perspective view of the vehicle tailgate system in accordance with an embodiment of the present patent application, wherein the tailgate is in its lowered, open position and the movable tailgate portion is in its released/drop-down position with the deployed step feature; and FIG. 13 shows a side view of the vehicle tailgate system in accordance with an embodiment of the present patent application, wherein the movable tailgate portion is in another released/drop-down position and wherein a movement of the movable tailgate portion (from its extended/horizontal position to its released/drop-down position) is restricted for avoiding any contact with a trailer hitch ball.

DETAILED DESCRIPTION OF THE DRAWINGS

Referring to FIGS. 1-2, 5, 7 and 12, the present patent application provides a vehicle tailgate system 10 for a vehicle 18. The vehicle tailgate system 10 includes a movable tailgate portion 12 that is operatively attached to the tailgate 14.

In one embodiment, the tailgate system 10 for the vehicle 18 comprises the tailgate 14 pivotally mounted to a vehicle body for movement about a generally horizontal pivot axis between an open position in which the tailgate 14 extends generally horizontally from a vehicle bed to allow access to a vehicle bed area and a closed position in which the tailgate 14 extends generally vertically to close access to the vehicle bed area. The tailgate 14 has an access opening or opening O configured to provide access to the vehicle bed area when the tailgate 14 is in the closed position. The tailgate 14 also has the movable tailgate portion 12 movably connected to the tailgate 14. The movable tailgate portion 12 is configured to cover the access opening O in the tailgate 14 when in a closed position of the movable tailgate portion 12. The tailgate 14 has a pocket opening P for receiving the movable tailgate portion 12 therein. The movable tailgate portion 12 is slidably mounted to the tailgate 14 for movement to an open position in which the movable tailgate portion 12 is received in the pocket opening P in the tailgate to uncover the access opening O in the tailgate 14.

As will be clear from the discussions below, in one embodiment, the movable tailgate portion 12 is slidably mounted to the tailgate 14 for movement to the open position thereof to uncover the access opening O in the tailgate 14 when the tailgate 14 is in the open position thereof to allow closer access of a user to the vehicle bed. In one embodiment, the movable tailgate portion 12 is slidably mounted to the tailgate 14 for movement to the open position to uncover the access opening O in the tailgate 14 when the tailgate 14 is in the closed position thereof.

As shown in FIGS. 1 and 2, the movable tailgate portion 12 is in its upright/vertical/closed position and the tailgate 14 is in its raised, closed position.

The vehicle tailgate system 10 is configured to provide the hidden (e.g., shown in center) tailgate portion 12 that slides downward into the tailgate 14 for ease of access into a pick-up truck bed 16 (as shown in FIG. 7). The vehicle tailgate system 10 further provides a fold-out step 24 (as shown in FIG. 12) feature integrated into the movable tailgate portion 12 to assist with access to the truck bed 16. The vehicle tailgate system 10 is configured to improve accessibility to the truck bed 16, both in a closed tailgate position (as shown in FIG. 5) and an open tailgate position (as shown in FIG. 7). The vehicle tailgate system 10 is also configured to assist with a "fifth wheel" hitch connection (or any other type of hitch connection located inside the pick-up truck bed).

In one embodiment, the vehicle 18 is a truck or pick-up truck. The tailgate 14 is generally configured to selectively close or allow access to the truck bed 16 area, for example, for loading or unloading cargo to or from the truck bed 16 area. The tailgate 14 may also be referred to as an endgate.

The tailgate 14 is pivotally mounted to a vehicle body 20 (as shown in FIG. 6) at a pick-up truck bed opening 22 (as shown in FIG. 7) for movement about a generally horizontal pivot axis. The tailgate 14 extends generally horizontally along the truck bed opening 22. The tailgate 14 may be moved between a raised, closed position (as shown in FIGS. 1-5) extending generally vertically and a lowered, open position (as shown in FIGS. 7-12) extending generally horizontally, for example, using a pair of hinge mechanisms. FIG. 6 shows an intermediate position of the tailgate 14 between the raised, closed position and the lowered, open position. In one embodiment, a hinge assembly is designed to be installed on the tailgate 14 for closing the truck bed opening 22 on the pick-up truck 18. For example, the tailgate hinge mechanism mounts the tailgate 14 for pivotal/swinging movement between at least a first (e.g., closed) and a second (e.g., open) positions. In one embodiment, the truck 18 also allows for torque rods to assist in at least opening and/or closing the tailgate 14. Generally, the hinge mechanisms are provided on opposing sides of the tailgate 14, and are used to pivotally mount the tailgate 14 for movement about the generally horizontal pivot axis with respect to the pick-up truck bed 16. The tailgates and the hinges for mounting them are well-known, and, therefore, are not be described in detail here.

In one embodiment, referring to FIG. 1, the tailgate 14 includes a right side portion RSP, a left side portion LSP and a central portion CP. In one embodiment, each of the left side portion LSP and the right side portion RSP of the tailgate 14 includes an inner panel 42, an outer panel 44 and opposing side panels 46 interconnecting the inner panel 42 and the outer panel 44 to define a compartment 52 with an interior space 50 therein. In one embodiment, as will be explained in detail below, the interior spaces 50 of the compartments 52 of the left side portion LSP and the right side portion RSP of the tailgate 14 are configured to receive components/mechanisms of the vehicle tailgate system 10. In one embodiment, the interior space 50 of the compartments 52 of the left side portion LSP and the right side portion RSP of the tailgate 14 is used to store other storage items therein.

In one embodiment, the side panel 46 of the left side portion LSP and the side panel 46 of the right side portion LSP that are facing the central portion CP of the tailgate 14 have gaps or openings 152 (as shown in FIG. 4) therein. In one embodiment, the gaps/openings 152 are configured to allow the components/mechanisms of the vehicle tailgate system 10 (i.e., stored interior spaces 50 of the compartments 52 of the left side portion LSP and the right side portion RSP) to be connected to the movable tailgate portion 12.

Referring to FIGS. 1 and 7, the central portion CP of the tailgate 14 also includes an inner panel IP, an outer panel OP and the pocket P formed therebetween. As will be clear from the discussion below, the pocket P of the central portion CP of the tailgate 14 is configured to receive the movable tailgate portion 12 therein when the movable tailgate portion 12 is in at least its down/vertical/access position (as shown in FIG. 5), in some of its intermediate positions (as shown in FIG. 6) and its hidden/horizontal position (as shown in FIG. 7). In one embodiment, the pocket P of the central portion CP of the tailgate 14 is configured to receive at least a portion of the movable tailgate portion 12 therein when the movable tailgate portion 12 is its intermediate positions (as shown in FIGS. 4 and 8).

The central portion CP of the tailgate 14 may be referred to as the pocketed portion. The pocketed portion CP of the tailgate 14 is shown in and is disposed at the center of the tailgate 14. In other embodiments, the pocketed portion CP of the tailgate 14 may be disposed at other locations of the tailgate 14.

The vehicle tailgate system 10 is configured to achieve the pocket-style access feature. As will be clear from the discussions below, this pocket-style access feature of the vehicle tailgate system 10 is possible by the movement of the movable tailgate portion 12 between a first position (FIGS. 1 and 2) and a second position (FIG. 5) when the tailgate 14 is in its raised, closed position and between the first position (FIG. 9) and the second position (FIG. 7) when the tailgate 14 is in its lowered, open position. The second positions include a position in which the movable tailgate portion 12 is received in the pocket P of the tailgate 14 to create the opening O (FIGS. 5 and 7) in the tailgate 14.

As shown in FIG. 5, in one embodiment, the vehicle tailgate system 10 is configured to allow for easier accessibility to the truck bed 16 without completely opening the tailgate 14. The opening O in the configuration of FIG. 5 may also assist with the fifth wheel hitch connection. That is, the vehicle tailgate system 10 is configured to assist with the fifth wheel hitch connection. The fifth wheel hitch and the gooseneck hitch are two types of hitches that are generally attached into the truck bed 16 of the truck 18 so that they are positioned to be forward of the rear wheel/axle of the truck 18. When using these types of hitches, the user of the prior art tailgates generally has to lower the tailgate of their pickup truck to its lowered, horizontal position to allow a tow trailer to reach and connect to the vehicle via these hitches (or any other type of hitch connection located inside the pick-up truck bed).

With the vehicle tailgate system 10 of the present patent application, the user, when using these types of hitches, can simply lower/slide the movable tailgate portion 12 to its down/vertical/access position (as shown in FIG. 5) into the pocket opening P to allow the tow trailer to reach and connect to the vehicle 18 via these hitches without interference from the tailgate 14. Lowering the movable tailgate portion 12 into the pocket P creates the opening O (as shown in FIG. 5) in the tailgate 14. The opening O in the tailgate 14 allows the fifth wheel hitch connection to be inserted therethrough (usually as the vehicle 18 is backed-up) for connection with the fifth wheel hitch mounted on the truck bed 16 of the vehicle 18. That is, using the vehicle tailgate system 10, the user will be able to connect the tow trailer to the vehicle 18 via these hitches without lowering the tailgate 14 to its lowered, horizontal position.

In one embodiment, the opening O in the configuration of FIG. 7 may also allow closer and more ergonomic accessibility to the truck bed 16. As shown in FIG. 7, the vehicle tailgate system 10 is configured to allow closer and more ergonomic accessibility to the truck bed 16 when the tailgate 14 is open and in its lowered, open position. For example, the insert in FIG. 7 shows that the user can stand closer to the truck bed 16 when the tailgate 14 is open and in its lowered, open position. This is possible because of the opening O (FIG. 7) formed in the tailgate 14 when the movable tailgate portion 12 is lowered or slid/moved into the pocket P. That is, the user can stand closer to the truck bed 16 and in the opening O (FIG. 7), when the tailgate 14 is open and in its lowered, open position, to easily and more ergonomic access the cargo on the truck bed 16.

The movable tailgate portion 12 has multiple positions/configurations. FIGS. 1-2 show the movable tailgate portion 12 in its upright/vertical/closed position, and FIG. 5 shown the movable tailgate portion 12 in its down/vertical/access position. FIG. 4 shows the movable tailgate portion 12 in an intermediate position between its upright/vertical/closed position and its down/vertical/access position. The tailgate 14 is in its raised, closed position in FIGS. 1-5.

FIG. 7 shows the movable tailgate portion 12 is in its hidden/horizontal/access position. FIG. 8 shows the movable tailgate portion 12 in an intermediate position between its hidden/horizontal/access position and its extended/horizontal position. FIG. 9 shows the movable tailgate portion 12 in its extended/horizontal position. FIG. 10 shows the movable tailgate portion 12 in an intermediate position between its extended/horizontal position and its released/drop-down position. FIG. 11 shows the movable tailgate portion 12 in its released/drop-down position. FIG. 12 shows the movable tailgate portion 12 in its released/drop-down position with the deployed step feature 24. FIG. 13 shows the movable tailgate portion 12 in another released/drop-down position for avoiding any contact a trailer hitch ball. The tailgate 14 is in its lowered, open position in FIGS. 7-13. FIG. 6 shows the tailgate 14 is in an intermediate position between its raised, closed position and its lowered, open position and the movable tailgate portion 12 is in its down/vertical/access position.

The movable tailgate portion 12 may include an opening 94 or void space (as shown in FIG. 12) therein to remove excess material and to reduce weight. The opening 94 is optional.

The vehicle tailgate system 10 includes a frame 26 that is configured to contain the movable tailgate portion 12 of the tailgate 14 along with the step 24 (as shown in FIGS. 8-12). The movable tailgate portion 12 may be panel member. The frame 26 contains the movable tailgate portion 12 of the tailgate 14 that pockets into the tailgate 14, along with the step feature (step 24 that folds out for access to the truck bed 16). The frame 26 may include U-shaped frame member that is configured to extend around three sides of the movable tailgate portion 12.

As shown in FIG. 4, on both its left side and its right side, the frame 26 includes a first connector portion 62 and a second connector portion 64. The first connector portion 62 may be positioned near the top of the frame 26 and the second connector portion 64 may be positioned near the bottom of the frame 26. The first and the second connector portions 62, 64 of the frame 26 have openings 66 therein to allow the first and the second connector portions 62, 64 to slide on corresponding slide mechanism 32 when the movable tailgate portion 12 of the tailgate 14 is moved between its upright/vertical/closed position (as shown in FIGS. 1-2) and at its down/vertical/access position (as shown in FIG. 5).

Referring to FIG. 4, the vehicle tailgate system 10 includes a top mount portion 72 that is positioned at and/or on top of the slide mechanism 32 and a bottom mount portion 74 that is positioned at and/or near the bottom of the slide mechanism 32. In one embodiment, the top mount portion 72 and the bottom mount portion 74 are configured to attach the slide mechanism 32 to the tailgate 14.

FIG. 3 shows an exemplary tilt mechanism/actuator 134 of the vehicle tailgate system 10 in accordance with an embodiment of the present patent application. The exemplary tilt mechanism/actuator 134 of the vehicle tailgate system are also shown in detail in FIG. 2. In one embodiment, the tilt mechanism/actuator 134 are configured to enable movable tailgate portion 12 to first tilt and then slide/move downward into the tailgate center frame CP. In one embodiment, the tilt actuator 134 is configured to enable the movable tailgate portion 12 to first tilt and then slide into the pocket opening P in the tailgate 14 when the movable tailgate portion 12 being moved from the movable tailgate portion closed position and the movable tailgate portion open position. In one embodiment, prior to the movable tailgate portion 12 being moved from the movable tailgate portion closed position to the movable tailgate portion open position, the tilt actuator 134 is configured tilt the movable tailgate portion 12 inwardly towards the vehicle bed so as to create a moving clearance between the movable tailgate portion 12 and the pocket opening P in the tailgate 14. In one embodiment, prior to the movable tailgate portion 12 being moved from the movable tailgate portion closed position to the movable tailgate portion open position, the tilt actuator 134 is configured tilt the movable tailgate portion 12 outwardly away the vehicle bed so as to create a moving clearance between the movable tailgate portion 12 and the pocket opening P in the tailgate 14.

In one embodiment, prior to the movable tailgate portion 12 being lowered from its upright/vertical/closed position (FIGS. 1-2) to its down/vertical/access position (FIG. 5), tailgate outer A-surface panel 82 (as shown in FIG. 1) is tilted inward (e.g., towards the truck bed 16) so as to create moving clearance and avoid damage to the tailgate outer A-surface panel 82. In another embodiment, prior to the movable tailgate portion 12 being lowered from its upright/vertical/closed position (FIGS. 1-2) to its down/vertical/access position (FIG. 5), the tailgate inner (non A-surface) panel 84 (FIG. 7) is tilted outwards (e.g., away the truck bed 16) so as to create moving clearance and avoid damage to the inner or outer panels.

In one embodiment, the tilt in the panels 82/84 is achieved geometrically (e.g., by angling the slide mechanism 32). In another embodiment, the tilt in the panels 82/84 is achieved mechanically via cam/pawl actuating motion. In one embodiment, the tilt in the panels 82/84 of the movable tailgate portion 12 is initiated by the customer/user, for example, through the tilt actuator 134. In one embodiment, the tilt actuator 134 is a mechanical actuator. In another embodiment, the tilt actuator 134 is an electronic actuator.

In one embodiment, the tilt action of the movable tailgate portion 12, as the movable tailgate portion 12 being moved from the movable tailgate portion closed position and the movable tailgate portion open position, has an advantage of allowing an exterior surface of the movable tailgate portion 12 to be flush or essentially flush with an exterior surface of the remainder of the tailgate 14 when the movable tailgate portion 12 is in its closed position. In one embodiment, the tilting action of the movable tailgate portion 12 also helps the movable tailgate portion 12 clear the tailgate structure when the movable tailgate portion 12 is being moved into the pocket opening P. In one embodiment, the tilt action of the movable tailgate portion 12 can be a small amount, and can be a shift in the track to provide just enough movement for the bottom edge of the movable tailgate portion 12 to clear the top edge of the remainder of the tailgate 14.

The vehicle tailgate system 10 includes a drive mechanism 28 that is configured to move the frame 26, along with the movable tailgate portion 12 and the step 24, such that the movable tailgate portion 12 (with the step 24) is positioned at its upright/vertical/closed position (as shown in FIGS. 1-2), at its down/vertical/access position (as shown in FIG. 5), and one or more intermediate positions (as shown in FIG. 4) therebetween when the tailgate 14 is its raised/closed position. The same drive mechanism 28 is also configured to move the frame 26, along with the movable tailgate portion 12 and the step 24, such that the movable tailgate portion 12 (with the step 24) is positioned at its hidden/horizontal/access position (as shown in FIG. 7), its extended/horizontal position (as shown in FIG. 9) and one or more intermediate positions (as shown in FIG. 8) therebetween when the tailgate 14 is its lowered/open position.

In one embodiment, the drive mechanism 28 is configured to slidably move the movable tailgate portion 12 between the open position thereof and the closed position thereof. In one embodiment, the drive mechanism 28 is configured to slidably move the movable tailgate portion into and out of the pocket opening P in the tailgate 14.

In one embodiment, the drive mechanism 28 includes the slide mechanism 32 and a power strut 30 as shown in FIG. 2. The power strut 30 may have an electric motor that is used to extend and retract the strut 30 to move the frame 26 of the movable tailgate portion 12 so as to position the movable tailgate portion 12 a) at its upright/vertical/closed position (as shown in FIGS. 1-2), at its down/vertical/access position (as shown in FIG. 5), and one or more intermediate positions (as shown in FIG. 4) therebetween; and b) at its hidden/horizontal/access position (as shown in FIG. 7), its extended/horizontal position (as shown in FIG. 9) and one or more intermediate positions (as shown in FIG. 8) therebetween.

In one embodiment, the drive mechanism 28 to achieve the sliding motion of the movable tailgate portion 12 is supplied along with the movable tailgate portion 12. In one embodiment, the drive mechanism 28 is contained within the adjacent tailgate 14 portion (e.g., the right side portion RSP and the left side portion LSP of the tailgate 14). In one embodiment, the slide mechanism 32 is shown as tubular in FIGS. 1-2. In other embodiments, other methods of mechanical movements may be used to position the movable tailgate portion 12 a) at its upright/vertical/closed position (as shown in FIGS. 1-2), at its down/vertical/access position (as shown in FIG. 5), and one or more intermediate positions (as shown in FIG. 4) therebetween; and b) at its hidden/horizontal/access position (as shown in FIG. 7), its extended/horizontal position (as shown in FIG. 9) and one or more intermediate positions (as shown in FIG. 8) therebetween.

In one embodiment, the drive mechanism 28 includes a linear actuator. In one embodiment, the drive mechanism 28 includes a lead screw, a lead nut, and a motor. The drive mechanism 28 may include a gear mechanism. The gear mechanism is connected to the motor to reduce the speed of the motor output while increasing the output torque. The motor is configured to rotate either clockwise or counterclockwise direction so as to raise or to lower the movable tailgate portion 12. The motor is configured (e.g., mechanically connected) to rotate the lead screw. The motor may also be configured to be indirectly connected, e.g., through a series of gears or a gearbox, to rotate the lead screw. That is, the lead screw is driven by the motor.

The lead screw is configured to pass through an opening of the lead nut. The lead screw includes threads machined on its outer surface and extending along its length. The lead nut is constructed and arranged to be threaded onto the lead screw and includes complimentary threads machined on its inner surface. The drive mechanism 28 is configured to prevent the rotation of the lead nut along with the lead screw. That is, the lead nut is restrained from rotating along with the lead screw, therefore the lead nut is configured to travel up and down the lead screw. When the lead screw is rotated by the motor, the lead nut is driven along the threads.

A portion of the frame 26 of the movable tailgate portion 12 is operatively connected to the lead nut to enable the movement of the frame 26 so as to position the movable tailgate portion 12 a) at its upright/vertical/closed position (as shown in FIGS. 1-2), at its down/vertical/access position (as shown in FIG. 5), and one or more intermediate positions (as shown in FIG. 4) therebetween, and b) at its hidden/horizontal/access position (as shown in FIG. 7), its extended/horizontal position (as shown in FIG. 9) and one or more intermediate positions (as shown in FIG. 8) therebetween. In one embodiment, the first connector portion 62 of the frame 26 is operatively connected to the lead nut to enable the movement of the frame 26 so as to position the movable tailgate portion 12 at its positions described above.

In one embodiment, the vehicle tailgate system 10 includes one drive mechanism that is configured to drive the frame 26 and the movable tailgate portion 12 supported therein (i.e., up and down or in and out) on both sides of the frame 26. In one embodiment, the vehicle tailgate system 10 includes two drive mechanisms, each of the two drive mechanisms is configured to drive the frame 26 and the movable tailgate portion 12 supported therein (i.e., up and down or in and out) on one side of the frame 26. In one embodiment, the two drive mechanisms are synchronized with each other to facilitate smooth movement (i.e., up and down or in and out) of the frame 26.

In one embodiment, the movable tailgate portion 12 of the tailgate 14 can be lowered inside the tailgate 14 as shown in FIGS. 5-7. In another embodiment, the movable tailgate portion 12 of the tailgate 14 can also be offset and lowered to the exterior of the tailgate 14. In yet another embodiment, the movable tailgate portion 12 of the tailgate 14 can also be offset and lowered to the interior of the tailgate 14.

In one embodiment, lowering the movable tailgate portion 12 into the tailgate 14 takes place when the tailgate 14 in its raised, closed position. In one embodiment, lowering the movable tailgate portion 12 into the tailgate 14 takes place when the tailgate 14 is in its lowered, open position.

In the open/horizontal position, the movable tailgate portion 12 can be rotated vertically 90 degrees, then the center panel 92 (FIG. 8) of the center portion/movable tailgate portion 12 can rotate horizontally 90 degrees to present the step feature 24 for the user for access to the truck bed 16.

As shown in FIG. 12, the vehicle tailgate system 10 is configured to provide the step 24 for the truck bed 16 ingress and egress. The vehicle tailgate system 10 is configured to provide accessibility to the truck bed 16 for small and large cargo loading.

In one embodiment, the tailgate system 10 further comprising a support assembly configured to support the movable tailgate portion 12 for pivotal movement with respect to the tailgate 14 to an extended position pivoted to extend outwardly from the tailgate 14. In one embodiment, the support assembly is configured to support the movable tailgate portion 12 for pivotal movement to the extended position when the tailgate 14 is in the open position such that the extended position of the movable tailgate portion 12 is a step position. In one embodiment, as shown in FIG. 12, the support assembly includes various hinge members, support cable members, lock members, etc. In one embodiment, the movable tailgate portion 12 includes a step on an inner surface thereof. The step is presented to the user for assistance to access to the truck bed when the tailgate 14 is in the open position and the movable tailgate portion 12 is pivoted to the step position.

The tailgate frame 26 and structure may be made of steel. Tailgate frame 26 and structure may be made of aluminum. The outer A-surface panel 82 (as shown in FIG. 1) of the movable tailgate portion 12 may be steel, aluminum or plastic. The outer A-surface panel 82 may be painted with customer/user desired colors and emblems. In the case of a plastic A-surface panel 82, an inner structural reinforcement (e.g., metallic or otherwise) may be used. The inner tailgate panel 84 (as shown in FIG. 7) of the movable tailgate portion 12 may be made of plastic with a durable finish. The step feature 24 may be steel or aluminum, and depending on customer requirements, may even be plastic. In one embodiment, several weather-strip components along the length of the movable tailgate portion 12 and on the sides of the slide mechanism 32 may be required to ensure performance and functional requirements are met.

The step 24 includes at least a stored position (as shown in FIGS. 1-11) and a use/deployed position (as shown in FIG. 12). The step 24 is configured to assist the user for entering/stepping into or exiting/stepping out of the truck bed 16 at the rear of the pickup truck 18. In one embodiment, the vehicle tailgate system 10 includes a lock configured to lock/secure the step 24 when it is in its stored position. The lock is configured to be moved from its lock position to its unlock position to enable the movement of the step 24 with respect to the movable tailgate portion 12 and from its stored position (as shown in FIG. 11) to the deployed position (as shown in FIG. 12). The lock includes a lock engagement portion and a lock portion. One of the lock engagement portion and the lock portion is connected to the movable tailgate portion 12 and the other of the lock engagement portion and the lock portion is connected to the step 24. In one embodiment, the step includes one or more textured portions that are configured to enhance a user's grip when stepping upon and using the step 24.

In one embodiment, several latches, hinges, struts, dampers, springs, rails, bushings and other mechanical and/or electrical components work together to achieve the sliding/pocketing and step features, movements/motion as will be explained in detail below. In one embodiment, dampers or springs may be used with the movable tailgate portion 12 to control its movement between its extended/horizontal position (FIG. 9) and its released drop-down position (FIG. 11). In one embodiment, dampers or springs may be used with the step 24 to control its movement between its stored position (FIG. 11) and its deployed position (FIG. 12).

Referring to FIG. 11, the movable tailgate portion 12 is pivotally mounted to the frame 26 for movement about a generally horizontal pivot axis. The movable tailgate portion 12 may be moved between its extended/horizontal position (as shown in FIG. 9) and its released/drop-down position (as shown in FIG. 11) extending generally vertically, for example, using a pair of hinge mechanisms. The movable tailgate portion 12 may also be moved between its extended/horizontal position (as shown in FIG. 9) and its released/drop-down position (as shown in FIG. 13) extending generally angularly, for example, using the same pair of hinge mechanisms. For example, the hinge mechanism mounts the movable tailgate portion 12 for pivotal/swinging movement between its above-noted positions. Generally, the hinge mechanisms are provided on opposing sides of the movable tailgate portion 12 and/or the frame 26, and are used to pivotally mount the movable tailgate portion 12 for movement about the generally horizontal pivot axis with respect to the frame 26. The hinge mechanism may include two hinge portions, one of two hinge portions is connected to the frame 26 and the other of two hinge portions is connected to the movable tailgate portion 12. Hinges for mounting members for pivotal/swinging movement between their positions are well-known, and, therefore, are not be described in detail here.

Referring to FIG. 11, the vehicle tailgate system 10 also include a lock assembly 102 configured to lock the movable tailgate portion 12 with respect to the frame 26 in each of its upright/vertical/closed position (as shown in FIGS. 1-2), its intermediate position (as shown in FIG. 4), its down/vertical/access position (as shown in FIG. 5), its intermediate position (as shown in FIG. 6), its hidden/horizontal/access position (as shown in FIG. 7), its intermediate position (as shown in FIG. 8), and its extended/horizontal position (as shown in FIG. 9). That is, the lock assembly 102 is configured to be in its lock position when the movable tailgate portion 12 is in or moving between the above-noted positions so as to prevent any relative movement between the movable tailgate portion 12 and the frame 26.

The lock assembly 102 is configured to be moved from its lock position to its unlock position to enable the movement of the movable tailgate portion 12 with respect to the frame 26 and from its extended/horizontal position (as shown in FIG. 9) to the released drop-down position (as shown in FIG. 12).

The lock assembly includes a lock engagement portion 106 and a lock portion 104. One of the lock engagement portion 106 and the lock portion 104 is connected to the movable tailgate portion 12 and the other of the lock engagement portion 106 and the lock portion 104 is connected to the frame 26.

The structural retention and rotation of the movable tailgate portion 12 and the step 24 are achieved through mechanical side hinges 122, center/mid hinge 124, latches and structural cables 112. All of these features can be locked and released manually, mechanically, electronically and/or automatically. In one embodiment, the support assembly includes the mechanical side hinges 122, the center/mid hinge 124, the latches and the structural cables 112.

In one embodiment, the tailgate assembly 10 includes lock assembly configured to be movable between: a lock position in which the lock assembly is configured to prevent pivotal movement of the movable tailgate portion 12 with respect to the tailgate 14 and to allow slidable movement of the movable tailgate portion 12 with respect to the tailgate 14; and a release position in which the lock assembly is configured to allow the pivotal movement of the movable tailgate portion 12 with respect to the tailgate 14 to the extended position pivoted to extend outwardly from the tailgate 14. The lock assembly includes a lock engagement portion and a lock portion. One of the lock engagement portion and the lock portion is connected to the movable tailgate portion 12 and the other of the lock engagement portion and the lock portion is connected to the tailgate 14.

Referring to FIG. 12, the vehicle tailgate system 10 includes support or structural cable(s) 112 (two are shown) that are configured to support the step 24 in its deployed position. The support cables 12 are provided on opposing sides of the movable tailgate portion 12 and the step 24. One end of each support cable 112 is connected to the step 24 and the other end of the support cable 112 is connected to the movable tailgate portion 12. In one embodiment, the vehicle tailgate system 10 includes one support cable 112.

Referring to FIG. 12, the step 24 is pivotally mounted to the movable tailgate portion 12 for movement about a generally horizontal pivot axis. The step 24 may be moved between its stored position (as shown in FIG. 11) extending generally vertically and its deployed position (as shown in FIG. 12) extending generally horizontally using a pair of hinge mechanisms. For example, the hinge mechanism 122, 124 mounts the step 24 for pivotal/swinging movement between its above-noted positions. Generally, the hinge mechanisms are provided on opposing sides of the step 24, and are used to pivotally mount the step 24 for movement about the generally horizontal pivot axis with respect to the movable tailgate portion 12. In the illustrated embodiment, the hinge mechanism includes one (or two) side hinge mechanism 122 disposed on the sides of the step 24/movable tailgate portion 12 and a center hinge mechanism 124 that is disposed in a central position of the step 24/movable tailgate portion 12.

The hinge mechanism may include two hinge portions, one of two hinge portions is connected to the movable tailgate portion 12 and the other of two hinge portions is connected to the step 24. Hinges for mounting members for pivotal or swinging movement between their positions are well-known, and, therefore, are not be described in detail here.

FIG. 13 shows a side view of the vehicle tailgate system 10, wherein the movable tailgate portion 12 is in another released/drop-down position. A movement of the movable tailgate portion 12, with respect to the tailgate 14 and from its extended/horizontal position (FIG. 9) to its released/drop-down position (FIG. 13), is restricted for avoiding any contact of the movable tailgate portion 12 with a trailer hitch/ball (not shown). That is, in one embodiment, the vehicle tailgate system 10 is configured to prevent its tailgate step/its movable tailgate portion 12 from hitting the regular trailer hitch. The trailer hitch may also be referred to as trailer tow hitch and has a (e.g., removable) trailer/tow ball.

In one embodiment, the vehicle tailgate system 10 includes a restrictor mechanism 162 that is configured to restrict the pivotal movement of the movable tailgate portion 12 with respect to the tailgate 14 to an angle less than 90 degrees. In one embodiment, the restrictor mechanism 162 is configured to move between: an operative position in which the restrictor mechanism 162 is configured to restrict the pivotal movement of the movable tailgate portion 12 with respect to the tailgate 14 to the angle less than 90 degrees so as to avoid any contact of the movable tailgate portion 14 with a trailer tow hitch/tow ball when the tailgate 14 is also in the open position; and an inoperative position in which the restrictor mechanism 162 is configured to allow the pivotal movement of the movable tailgate portion 12 with respect to the tailgate 14 to the step position pivoted downwardly from the tailgate 14 in the open position thereof to provide the step.

As shown in FIG. 13, the restrictor mechanism 162 of the vehicle tailgate system 10 is configured to restrict this movement of the movable tailgate portion 12 to an angle less than 90 degrees. The angle is measured from its extended/horizontal position (FIG. 9). In one embodiment, the vehicle tailgate system 10 is configured to restrict the movement of the movable tailgate portion 12 to 45 degrees. In this configuration, the step 24 is configured to pivot more than 90 degrees from its stored position to its deployed/used position. For example, the step 24 is configured to pivot 135 degrees from its stored position to its deployed/used position when the movement of the movable tailgate portion 12, from its extended/horizontal position (FIG. 9) to its released/drop-down position (FIG. 13), is restricted to 45 degrees.

The restrictor mechanism 162 may include two link members 164, 166 that are connected to each other (at one of their ends, for example, at a pivot connection 168) and are pivotable with respect to each other about the pivot connection 168. The other ends of the link members 164, 166 are connected to the tailgate 14/frame 26 and the movable tailgate portion 12, respectively. One skilled in the art would readily appreciate that other restrictor mechanisms may be used to restrict the movement of the movable tailgate portion 12. The angles provided here are exemplary, it is contemplated that the movement of the movable tailgate portion 12 is restricted to other angles as long as the movable tailgate portion 12 is not making any contact with the trailer hitch ball. In one embodiment, the vehicle tailgate system 10 includes one restrictor mechanism on one side of the movable tailgate portion 12. In another embodiment, the vehicle tailgate system 10 includes two restrictor mechanisms, one on each side of the movable tailgate portion 12.

In one embodiment, the restrictor mechanism is configured to be moved between an inoperative position and an operative position. When the restrictor mechanism is in its operative position, it is configured to restrict the movement of the movable tailgate portion 12, as described above, to avoid any contact of the movable tailgate portion 12 with the trailer tow hitch/tow ball. When the restrictor mechanism is in its inoperative position, it is configured not to restrict the movement of the movable tailgate portion 12 or to allow the movement of the movable tailgate portion 12 (i.e., to its released/drop-down position (FIG. 11). This later configuration may be used when the vehicle 18 has no trailer hitch/ball installed thereon such that the movable tailgate portion 12 moves 90 degrees from its extended/horizontal position (FIG. 9) to its released/drop-down position (FIG. 11).

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A tailgate system for a vehicle comprising:
   a tailgate pivotally mounted to a vehicle body for movement about a generally horizontal pivot axis between an open position in which the tailgate extends generally horizontally from a vehicle bed to allow access to a vehicle bed area and a closed position in which the tailgate extends generally vertically to close access to the vehicle bed area;
   wherein the tailgate has an access opening configured to provide access to the vehicle bed area when the tailgate is in the closed position and a movable tailgate portion movably connected to the tailgate, the movable tailgate portion configured to cover the access opening in the tailgate when in a closed position of the movable tailgate portion; and
   wherein the tailgate has a pocket opening for receiving the movable tailgate portion therein, and the movable tailgate portion being slidably mounted to the tailgate for movement to an open position in which the movable tailgate portion is received in the pocket opening in the tailgate to uncover the access opening in the tailgate, further comprises:
   a drive mechanism configured to slidably move the movable tailgate portion between the open position thereof and the closed position thereof, and
   a tilt actuator configured to enable the movable tailgate portion to first tilt and then slide into the pocket opening in the tailgate when the movable tailgate portion being moved from the movable tailgate portion closed position to the movable tailgate portion open position.

2. The tailgate system of claim 1, wherein the drive mechanism is configured to slidably move the movable tailgate portion into and out of the pocket opening in the tailgate.

3. The tailgate system of claim 1, wherein, prior to the movable tailgate portion being moved from the movable tailgate portion closed position to the movable tailgate portion open position, the tilt actuator is configured tilt the movable tailgate portion inwardly towards the vehicle bed so as to create a moving clearance between the movable tailgate portion and the pocket opening in the tailgate.

4. The tailgate system of claim 1, wherein, prior to the movable tailgate portion being moved from the movable tailgate portion closed position to the movable tailgate portion open position, the tilt actuator is configured tilt the movable tailgate portion outwardly away from the vehicle bed so as to create a moving clearance between the movable tailgate portion and the pocket opening in the tailgate.

5. The tailgate system of claim 1, further comprising a support assembly configured to support the movable tailgate portion for pivotal movement with respect to the tailgate to an extended position pivoted to extend outwardly from the tailgate.

6. The tailgate system according to claim 5, wherein the support assembly is configured to support the movable tailgate portion for pivotal movement to the extended position when the tailgate is in the open position such that the extended position of the movable tailgate portion is a step position.

7. The tailgate system of claim 1, wherein the movable tailgate portion is slidably mounted to the tailgate for movement to the open position thereof to uncover the access opening in the tailgate when the tailgate is in the open position thereof to allow closer access of a user to the vehicle bed.

8. The tailgate system of claim 1, wherein the movable tailgate portion is slidably mounted to the tailgate for movement to the open position to uncover the access opening in the tailgate when the tailgate is in the closed position thereof.

9. A tailgate system for a vehicle comprising:
   a tailgate pivotally mounted to a vehicle body for movement about a generally horizontal pivot axis between an open position in which the tailgate extends generally horizontally from a vehicle bed to allow access to a vehicle bed area and a closed position in which the tailgate extends generally vertically to close access to the vehicle bed area;
   wherein the tailgate has an access opening configured to provide access to the vehicle bed area when the tailgate is in the closed position and a movable tailgate portion movably connected to the tailgate, the movable tailgate portion configured to cover the access opening in the tailgate when in a closed position of the movable tailgate portion; and wherein the tailgate has a pocket opening for receiving the movable tailgate portion therein, and the movable tailgate portion being slidably mounted to the tailgate for movement to an open position in which the movable tailgate portion is received in the pocket opening in the tailgate to uncover the access opening in the tailgate, wherein the tailgate system further comprises:

a support assembly configured to support the movable tailgate portion for pivotal movement with respect to the tailgate to an extended position pivoted to extend outwardly from the tailgate, wherein the support assembly is configured to support the movable tailgate portion for pivotal movement to the extended position when the tailgate is in the open position such that the extended position of the movable tailgate portion is a step position, and a lock assembly configured to be movable between:

a lock position in which the lock assembly is configured to prevent pivotal movement of the movable tailgate portion with respect to the tailgate and to allow slidable movement of the movable tailgate portion with respect to the tailgate; and a release position in which the lock assembly is configured to allow the pivotal movement of the movable tailgate portion with respect to the tailgate to the extended position.

10. The tailgate system of claim 9, further comprising a restrictor mechanism configured to restrict the pivotal movement of the movable tailgate portion with respect to the tailgate to an angle less than 90 degrees.

11. The tailgate system of claim 10, wherein the restrictor mechanism is configured to move between:

an operative position in which the restrictor mechanism is configured to restrict the pivotal movement of the movable tailgate portion with respect to the tailgate to the angle less than 90 degrees so as to avoid any contact of the movable tailgate portion with a trailer tow hitch/tow ball when the tailgate is also in the open position; and an inoperative position in which the restrictor mechanism is configured to allow the pivotal movement of the movable tailgate portion with respect to the tailgate to the step position pivoted downwardly from the tailgate in the open position thereof to provide the step.

12. The tailgate system of claim 9, wherein the movable tailgate portion includes a step on an inner surface thereof, the step being presented to the user for assistance to access to the truck bed when the tailgate is in the open position and the movable tailgate portion is pivoted to the step position.

* * * * *